United States Patent
Skoff

(10) Patent No.: US 6,594,566 B1
(45) Date of Patent: Jul. 15, 2003

(54) METHOD FOR THE AUTOMATIC OPERATION OF A TIRE INFLATION DEVICE FOR MOTOR VEHICLES

(75) Inventor: Gerhard Skoff, Vienna (AT)

(73) Assignee: Steyr-Daimler-Puch Spezialfahrzeug AG, Vienna (AU)

( * ) Notice: Subject to any disclaimer, the term of this patent is extended or adjusted under 35 U.S.C. 154(b) by 0 days.

(21) Appl. No.: 09/958,083
(22) PCT Filed: May 17, 2000
(86) PCT No.: PCT/AT00/00137
§ 371 (c)(1),
(2), (4) Date: Oct. 2, 2001
(87) PCT Pub. No.: WO00/69662
PCT Pub. Date: Nov. 23, 2000

(30) Foreign Application Priority Data

May 17, 1999 (AT) .................................. 871/99

(51) Int. Cl.⁷ .............................................. B60C 23/00
(52) U.S. Cl. ........................... 701/36; 701/29; 340/442; 152/415; 73/146.2
(58) Field of Search ..................... 701/29, 36; 340/442, 340/443, 444; 152/415, 416, 417, 418; 73/146.2

(56) References Cited

U.S. PATENT DOCUMENTS

| | | | | |
|---|---|---|---|---|
| 5,327,346 A | * | 7/1994 | Goodell | 701/71 |
| 5,589,815 A | * | 12/1996 | Nishihara et al. | 340/444 |
| 5,629,873 A | * | 5/1997 | Mittal et al. | 702/140 |
| 6,144,295 A | * | 11/2000 | Adams et al. | 340/442 |
| 6,182,021 B1 | * | 1/2001 | Izumi et al. | 702/138 |

FOREIGN PATENT DOCUMENTS

EP         504913 A1  *  9/1992  .......... B60C/23/00

* cited by examiner

Primary Examiner—Michael J. Zanelli
Assistant Examiner—Eric M Gibson
(74) Attorney, Agent, or Firm—Herbert Dubno

(57) ABSTRACT

Tire pressure is automatically checked when the motor vehicle is started. At the same time, the type of operation, either off-road operation or on-road operation, is detected. According to the inventive method, in the on-road operation of the motor vehicle, the speed of all four wheels is measured and it is made sure whether or not there is an inadmissible difference in wheel speed. If the wheel speeds do not differ, the theoretical tire pressure is determined. If the actual tire pressure differs from the theoretical pressure, the inflation or deflation valves of the tires are actuated until the theoretical value is achieved, thereby adjusting the theoretical value. If the wheel speeds differ, as for example, during the operation state of the off-road mode, the vehicle speed is measured and is compared with a threshold value.

4 Claims, 2 Drawing Sheets

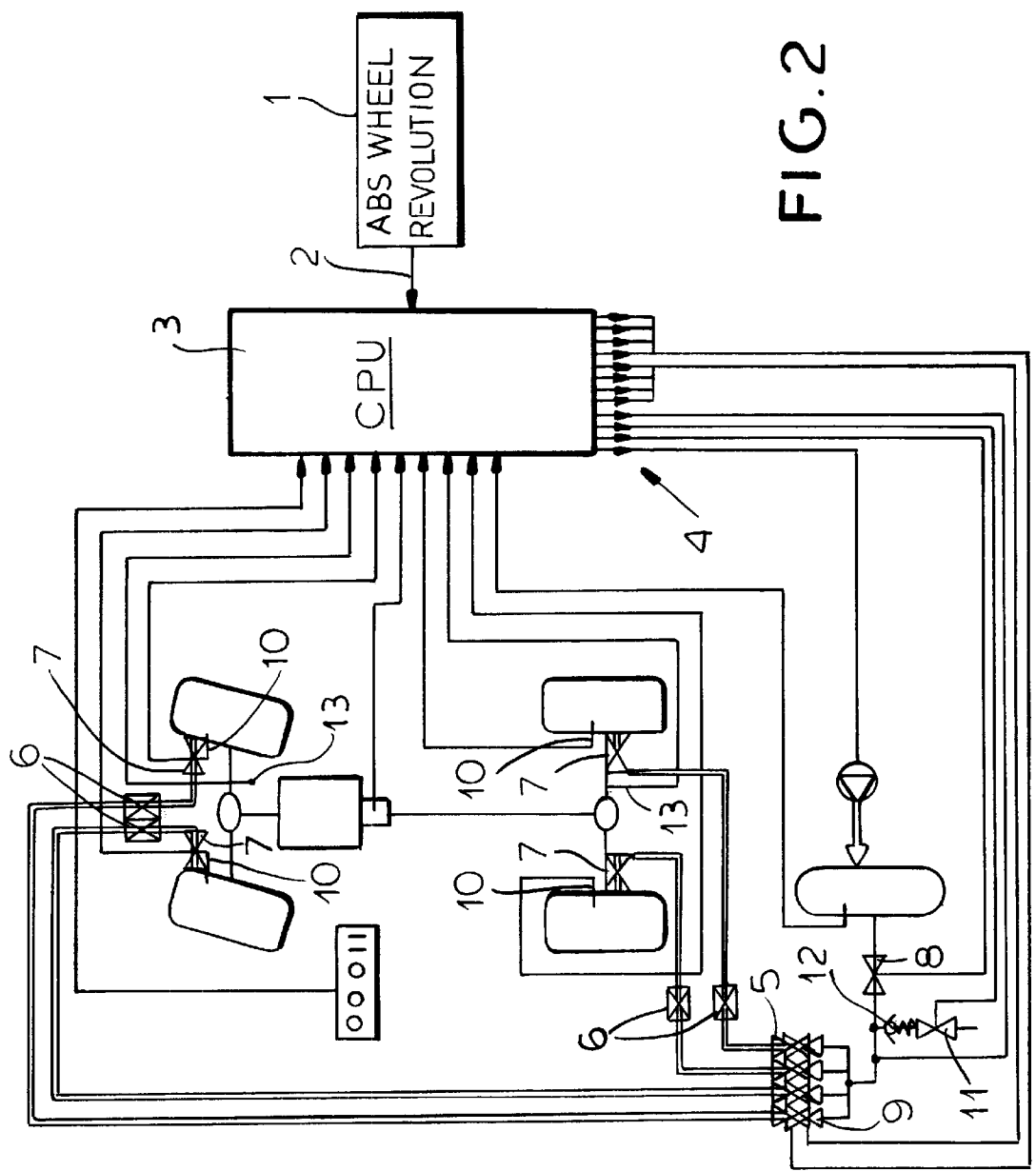

METHOD FOR THE AUTOMATIC OPERATION OF A TIRE INFLATION DEVICE FOR MOTOR VEHICLES

CROSS REFERENCE TO RELATED APPLICATIONS

This application is the national stage of phase of PCT application PCT/AT00/00137 filed May 17, 2000 and based upon Austrian National application A871/99 of May 17, 1999 under the International Convention.

FIELD OF THE INVENTION

The invention relates to a method for automatic operation of an inflation device for motor vehicle tires.

BACKGROUND OF THE INVENTION

A brief view of the world of private motor vehicles just a few ears ago would have revealed that all-wheel drive vehicles could be divided essentially into two categories, namely, high-performance and all-terrain vehicles.

On the one hand, all-wheel drive vehicles were mostly high-performance top-of-the-range variants of midquality to luxury vehicles, in which the driving torque had been distributed over two axles to reduce the load on the powertrain and to improve safety. On the other hand they were all-terrain vehicles that had been designed in the first instance for off-road use The constant advances in the development of these vehicles, the growing range of recreational opportunities and the rising standard of living have opened the market for sport utility vehicles. These are vehicles that follow the trend of active recreational use, and also provide economy and driving comfort as well as a limited off-road capability. Many manufacturers now offer such a compromise between an all-terrain vehicle and a comfortable limousine.

These vehicles are essentially characterized by two elements: inexpensive off-road technology, which is based principally on electronic powertrain control and is not designed for prolonged use in difficult terrain, and the very generous, spacious and comfortable interior of the limousine, thus providing for comfortable travel for longer journeys as well.

The present invention is designed primarily with this category of vehicles in mind, but can be used equally effectively for pure off-road vehicles and other luxury road cars.

Particularly in the case of military off-road vehicles, the state of the art is such that vehicles are equipped with a centralized device for inflating tires. Thus the driver can increase or reduce tire pressure while travelling, either by selecting preset pressure settings typical for the terrain in question or by making an ungraduated adjustment.

The advantage of the ungraduated option consists in the ability to make the optimum adjustment with respect to the terrain over which the vehicle is travelling and the degree of loading to which it is subjected. It is also possible to compensate for the effects of temperature.

The purpose of devices of this kind is chiefly to improve traction by reducing the pressure in the tires, and thus also the specific contact pressure.

Another field of application for a tire inflation device is its comfort and stability enhancing effects. High-performance limousines in the medium and luxury class suffer from the basic problem that for reasons of driving dynamics they require a very rigid undercarriage at high speeds, whereas at lower speeds the comfort of the occupants is more important.

OBJECT OF THE INVENTION

The object of the present invention is, therefore, to combine the two fundamental functions, traction and comfort, so that any necessary operation can be identified and carried out by sensor technology, with no driver intervention required.

SUMMARY OF THE INVENTION

This is achieve in the following manner: When the vehicle is started, the tire pressure is measured automatically and the driving conditions, whether on-road or off-road, are determined.

for road driving conditions, the speed of all four wheels is measured and a check is performed to ensure that the difference between the speeds of the wheels is within a certain tolerance, if the difference between the wheel speeds is within the tolerance, the tire pressure setpoint is calculated, and if actual value deviates from the setpoint, the inflation or deflation valve is activated until the setpoint is reached and established, if the difference between the wheel speeds is not within the tolerance, the driving speed is measured as for off-road driving conditions and this is compared with a threshold value, if this threshold value is not exceeded, the deflation valves are activated and a tire pressure that is still permissible is established.

The tire pressure is measured each time these steps are completed, and the cycle is then repeated from the beginning.

This method provides automatic monitoring of driving conditions—off-road or street driving—by monitoring any reduction gear switch and/or the level sensors (if the vehicle is equipped with a ride leveler) for frequent movements of the vehicle, and/or the wheel revolution differences and/or differential locks and/or a manually operated traction selection switch.

The method according to the invention provides automatic adjustment of tire pressure according to speed and load on the basis of various sensor signals, and also significant traction control in off-road use. The need for intervention to increase traction is determined on the basis of sensor signals. A logic circuit links information about differing wheel revolutions, required reduction gears and differential locks of many different types. Information from electric differential locks, limited slip differentials and positive engagement locks can be processed.

The most important feature of the present invention is that the entire system effectively operates automatically without driver intervention to calculate the correct tire pressure, based on measurements of axle load, driving speed and traction requirement/driving surface conditions, but certain settings can be made manually if the driver so wishes.

BRIEF DESCRIPTION OF THE DRAWING

The above and other objects, features, and advantages will become more readily apparent from the following description, reference being made to the accompanying drawing in which:

FIG. 2 is a diagram of the apparatus.

SPECIFIC DESCRIPTION

Figure 1:
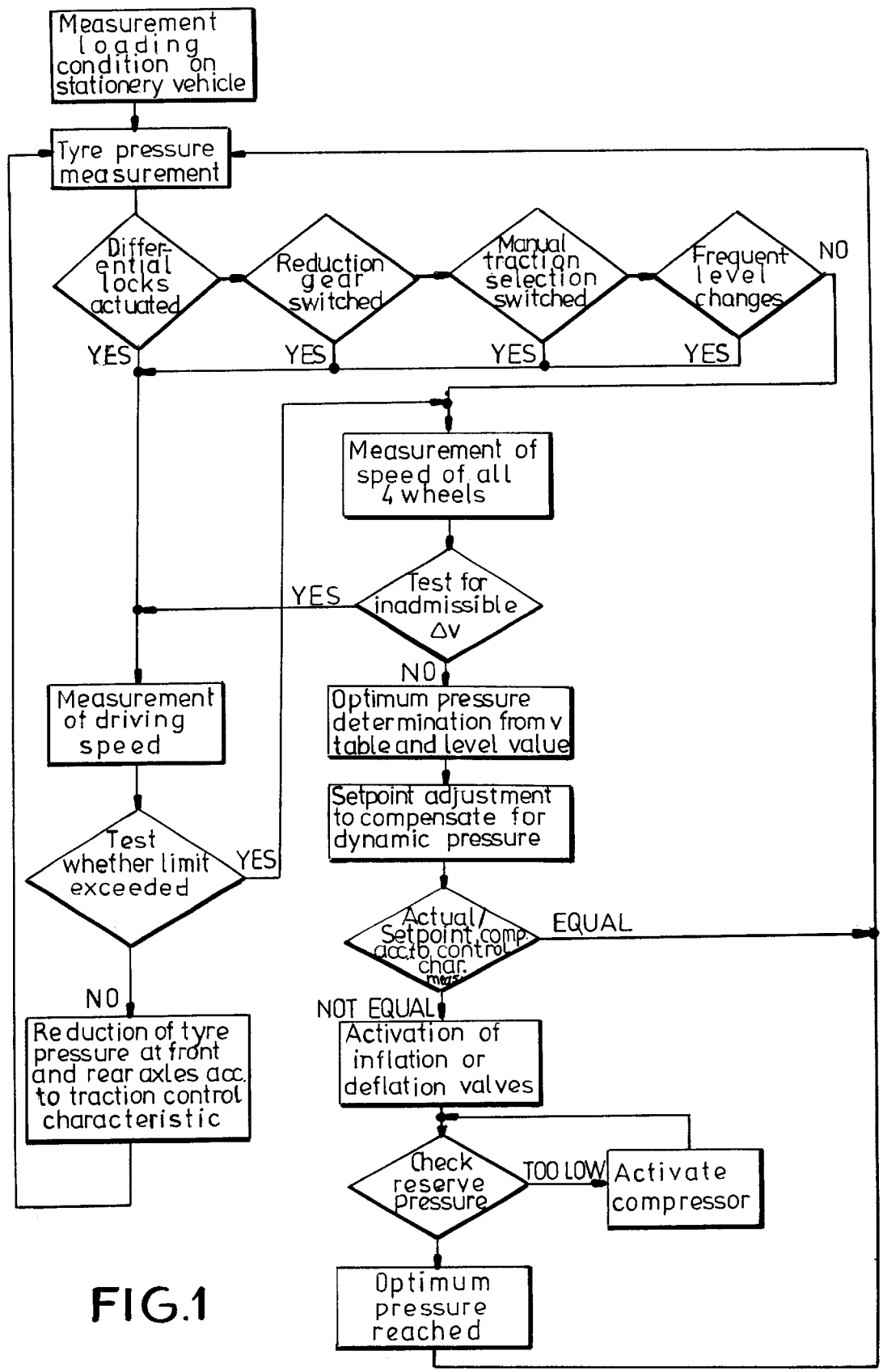
FIG. 1 is an information flow diagram or algorithm of the invention.

FIG. 1 shows the logical steps of the method or program in the form of a flow diagram. The detailed function for inflating and deflating the tires as well as other possible functions are described in the following with reference to FIG. 2.

INFLATION

It the driving speed, as recorded by the vehicle ABS system 1 and transmitted to the CPU 3 via bus 2, exceeds the switching values defined in the respective control characteristics.

CPU 3 sends a signal to inflate the tires over control circuits 4. Control valves 5 are actuated electromagnetically and the pressurized air passes through the control air duct in compression unit 6 to wheel valves 7, opening the valves for inflation. Pressurized air then passes through inlet valve 8, which is operated simultaneously, inflation valve 9 and the air duct in compression unit 6 to whichever wheel valve 7 is opened to inflate the tire. The static pressure values are passed to CPU 3 via sensor 10. At this point, it is important to note that total pressure in both inflation and deflation procedures consists of static and dynamic pressure combined, but only static air pressure can be measured without sophisticated equipment. Total pressure can be recorded empirically for each individual system using the throughput characteristics of the compressor and an all-purpose buffer memory, and subsequently calculated with a sufficient degree of precision. When this calculated value is reached, the procedure is terminated, the valves are released and returned to their start positions by springs; the air is vented from the control and inflation circuits as far as wheel valve 7 and compression unit 6 is depressurized. This is important because the seals are hardly exposed to any wear in the depressurized state, which has a significant effect on the operating life of the compression unit.

DEFLATION

When the driving speed falls below the switching values defined in the respective control characteristics, a signal to deflate the tires is sent by the CPU 3. Inlet valve 8 remains closed, vent valve 11 is opened, as are control valve 5 and inflation valve 9. Pressurized air passes through control valve 5 and the control air duct in compression unit 6 to wheel valve 7, and opens it. Pressurized air from the tire is now expelled through wheel valve 7 and the control air duct in compression unit 6 to the inflation valve which is also open though a nonreturn valve 12 to vent valve 11, and escapes into the atmosphere through a noise absorber. This process is continued until the value CPU 3 receives from pressure sensor 10 matches the calculated setpoint. Then, the valves are released and returned to their start positions by springs. The air is vented from the control circuits for valves 5 and inflation circuits 9 as far as the wheel valves 7, the respective compression unit 6 is depressurized. Nonreturn valve 12 ensures that the air pressure does not fall below the intended value by terminating the operation when this value is reached.

FAILURE DETECTION

In a practical improvement, tire failures can be detected. Means 10 for contactless tire pressure measurement monitors the air pressure in the tires constantly; if the device detects a loss of pressure not associated with a regulating process, and that is inconsistent with the control characteristics from CPU 3 and the driving conditions as indicated by the sensors described in the foregoing, a tire failure is assumed. To avoid invalid indications, an appropriate offset time should be taken into account.

In addition to visible and audible warnings, it is possible to regulate the driving speed at a value close to the limit of the permissible according to the control characteristics.

It is possible to compensate for concealed tire failures with minor loss of pressure. The driver receives the appropriate failure warning, but the vehicle can retain full mobility.

This failure monitoring algorithm may be calculated redundantly by the use of electronic stabilizing programs on the basis of revolution differences compared with the setpoint, or may replace the setpoint, also for reasons of increased accuracy and the compensating capability in the event of concealed failures.

SELF-TEST OR PRESSURE CHECKING

The installation proposed here assumes a means for contactless tire pressure measurement that is already installed in the vehicle. Should this not be possible for any reason, periodic tire pressure checks may also be performed by CPU 3. In such a case, CPU 3 initiates a deflation procedure; however, vent valve 11 is not controlled electronically, it remains closed. The sensor necessary for this 14 returns the pressure value to CPU 3 over the corresponding control circuit 4, then the test is terminated or the tire is inflated or deflated depending on the results of the measurement.

This test should be repeated when certain driving conditions arise, e.g. forward travel at constant speed. This also allows failure detection to be performed reliably.

TRACTION CONTROL OR OFF-ROAD DRIVING

Besides a variety of traction control measures, such as ASR or locking differentials, under certain circumstances, e.g. in off-road driving or to avoid wheelspin when moving off, it may be advantageous to increase traction by reducing the tire pressure, thus directly increasing the tire footprint, lowering the contact pressure, and raising the adhesion potential. The invention provides for sensor technology to make this determination. Depending on the equipment included in the vehicle, this may be solved in a number of ways:

monitoring of the switch for reduction gear, if present, or
monitoring of level sensors, if a ride leveler is present, for frequent vehicle movements, or
monitoring of wheel revolution signals for inadmissible revolution differences, or
differential locks, both mechanical and electronic, or
monitoring of a manually operated traction change switch.

If such a driving condition is detected by the sensor technology, it is assumed that the vehicle is travelling off-road, and the tire pressure is reduced to a specific level that has been preset for the vehicle in question. Compensation for vehicle loading remains active, but the speed-related regulation is suppressed.

COMPENSATION FOR THE LOADING CONDITION

The system is initialized when the vehicle is started. At this point, the information from level sensors 13 on both axles is analyzed and a pressure value calculated according to the loading condition of the vehicle is applied to the basic control characteristic tire pressure over vehicle speed. Since the loading condition is quasi-static in most cases, this applied factor is only determined at initialization, to avoid invalid analyses due to discontinuities associated with the dynamics of the vehicle's movement.

ADJUSTMENT OF INTERNAL TIRE PRESSURE TO COMPENSATE FOR SPEED

CPU 3 includes one control characteristic internal tire pressure over driving speed for each axle, the front and the rear. This control characteristic is compared with the current speed, which is determined by the wheel revolution sensors in the ABS system 1 and transmitted to CPU 3 via bus 2, yielding an optimum pressure for the tires on the front and rear axles. This optimum value is further adjusted by the application factor derived from the loading condition and compared with the actual values. If deviation is detected, the corresponding internal tire pressure on each axle is adjusted to the optimum value.

The control characteristics may take any form, and may run either continuously or in discrete steps. It is also possible to provide for a hysteresis with respect to any change in speed.

This adjustment of the internal tire pressure according to driving speed functions as an alternative to the "traction" function; if the traction function is active, the speed-related adjustment function is temporarily disabled.

What is claimed is:

1. A method for automatic operation of an inflation device for motor vehicle tires, comprising the steps of:

(a) measuring a tire pressure of a vehicle automatically when the vehicle is started and monitoring a driving condition, whether on-road or off-road, automatically by monitoring at least one unit selected from a reduction gear switch, level sensor, wheel revolution sensor, differential lock, and a manually operated traction selection switch;

(b) measuring under road driving conditions, speeds of all four wheels of the vehicle and performing a check to ensure that a difference between the speed of the wheels is within a certain tolerance;

(c) if the difference between the wheel speeds is within the certain tolerance, calculating a tire pressure setpoint, and if an actual value of tire pressure deviates from the setpoint, activating respective inflation or deflation valves of the tire until the setpoint is reached and established, (d) if the difference between the wheel speeds is not within the certain tolerance, measuring a driving speed of the vehicle as for off-road driving conditions comparing a measured driving speed with a threshold value, and if the threshold value is not exceeded, activating deflation valves of the tires and establishing therein tire pressures that have been preset for off-road driving; and (e) measuring the tire pressure each time steps (a)–(d) are completed, and repeating a cycle of steps (a)–(d).

2. The method according to claim 1 wherein a loading condition of the vehicle is measured while the vehicle is stationary.

3. The method according to claim 2 wherein the setpoint for the tire pressure is corrected by the addition of an application factor based on the loading condition.

4. The method according to claim 1 wherein, if a loss of pressure not associated with steps c) or d) is detected, a warning signal is triggered or the driving speed is governed to a value that is permissible.

* * * * *

UNITED STATES PATENT AND TRADEMARK OFFICE
CERTIFICATE OF CORRECTION

PATENT NO.    : 6,594,566 B1
DATED         : July 15, 2003
INVENTOR(S)   : Gerhard Skoff It is certified that error appears in the above-identified patent and that said Letters Patent is hereby corrected as shown below:

<u>Title page,</u>
Item [73], Assignee, should read:
-- Steyr-Daimler-Puch Spezialfahrzeug AG & Co. KG
   Vienna (AT) --

Signed and Sealed this

Thirteenth Day of January, 2004

JON W. DUDAS
*Acting Director of the United States Patent and Trademark Office*